United States Patent [19]

Sugaya et al.

[11] 3,987,485
[45] Oct. 19, 1976

[54] MAGNETIC HEAD WITH THIN FILM COMPONENTS

[75] Inventors: Hiroshi Sugaya, Suita; Takeshi Ishihara, Neyagawa; Fukashi Kobayashi, Hirakata; Kenji Kanai, Neyagawa, all of Japan

[73] Assignee: Matsushita Electric Industrial Co., Ltd., Osaka, Japan

[22] Filed: Feb. 13, 1974

[21] Appl. No.: 442,198

[30] Foreign Application Priority Data

| | | |
|---|---|---|
| Feb. 20, 1973 | Japan | 48-20874 |
| Aug. 11, 1973 | Japan | 48-90389 |
| Feb. 20, 1973 | Japan | 48-22366[U] |
| Feb. 20, 1973 | Japan | 48-22367 |
| Feb. 20, 1973 | Japan | 48-22368 |

[52] U.S. Cl. .................. 360/63; 360/122; 360/112; 360/123; 360/113
[51] Int. Cl.² ............... G11B 15/12; G11B 5/38; G11B 5/22
[58] Field of Search ......... 360/122, 126, 125, 124, 360/112, 63, 123, 113

[56] References Cited
UNITED STATES PATENTS

| | | | |
|---|---|---|---|
| 3,389,230 | 6/1968 | Hudson | 360/112 |
| 3,443,036 | 5/1969 | Maass | 360/112 |
| 3,493,694 | 2/1970 | Hunt | 360/113 |
| 3,639,699 | 2/1972 | Tiemann | 360/126 |
| 3,657,806 | 4/1972 | Simon | 360/125 |
| 3,668,670 | 6/1972 | Anderson | 360/112 |
| 3,672,043 | 6/1972 | Trimble | 360/125 |

*Primary Examiner*—Bernard Konick
*Assistant Examiner*—Alan Faber
*Attorney, Agent, or Firm*—Stevens, Davis, Miller & Mosher

[57] ABSTRACT

A flux sensitive magnetic head is disclosed which comprises conductive electrodes formed contiguous to the principal surface of a semiconductor substrate at a predetermined spacing, the electrodes being formed by evaporating or diffusing a conductive material on or into the substrate, and a flux sensitive element bridging the electrodes. This head may have a small size and is suited for constructing multi-track heads.

7 Claims, 8 Drawing Figures

MAGNETIC HEAD WITH THIN FILM COMPONENTS

This invention relates to flux sensitive magnetic heads.

The magnetic heads presently in widespread use are called ring type head, and this type of head has a construction comprising a core of a magnetic material, a coil wound on the core and a gap formed in the magnetic circuit constituted by the core.

The most serious problem encountered in the manufacture of the magnetic head has been that very small component parts have to be assembled substantially manually, so that the yield is low. Particularly, in the case of multi-track heads whose use is promised to increase, with an increase in the number of tracks to $n$ tracks the yield is reduced to $1/n$. Also, at present the upper limit of the number of tracks for one inch is 40 to 50 tracks due to the space required for the coil. However, there is a trend toward increasing the number of tracks demanded per inch.

The present invention is directed to an effective solution to this problem with a magnetic head construction made by forming electrodes on or in a semiconductor substrate such as a silicon substrate and forming a ferromagnetic thin film or hole element serving as a flux sensitive element bridging the electrodes.

The primary object of the invention is to minimize the dimension of the unit head in the direction of the track width.

Another object of the invention is to provide a multi-track head of simple construction consisting of a plurality of unit heads.

A further object of the invention is to provide a head of high sensitivity.

According to the invention, a plurality of flux sensitive magnetic heads arranged in the transversal direction of a recording tape are selectively driven one after another. Thus, high frequency signals can be reproduced with less mechanical components required compared to the prior art arrangement using a rotary head assembly.

The above and other objects of the invention, together with the construction and effects thereof, will become more apparent from the following description taken in conjunction with the accompanying drawings, in which.

Figure 1:
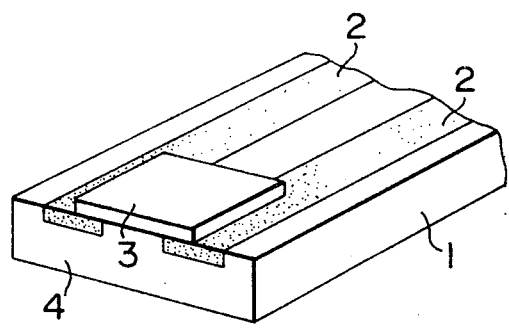
FIG. 1 is a fragmentary perspective view of a magnetic head according to the invention.

FIG. 1 shows a flux sensitive unit magnetic head according to the invention. Numeral 1 designates a semiconductor substrate such as a silicon wafer or silicon tip, in which is formed parallel electrodes 2 contiguous to the substrate surface and at a predetermined distance from each other. The electrodes 2 may be formed by vapor-deposition of a conductive material such as copper and aluminum. Alternatively, they may be conductive layers formed by means of diffusion or anodic oxidation or injection or implantation of the conductive material into the substrate as in the illustrated case. A magnetic flux sensitive element 3 is then formed to bridge the electrodes 2 adjacent the face 4 of the substrate adapted to face the recording medium. The flux sensitive element may be a precipitated film formed by vapor-deposition of a ferromagnetic material such as a permalloy. The order of steps of forming the electrodes and flux sensitive element may be reversed if it is found necessary, that is, it is possible to form the flux sensitive element 3 first and then form the electrodes 2 at predetermined locations.

In case of using a ferromagnetic thin film as the flux sensitive element 3, a highly sensitive of flux sensitive element may be realized by forming an anisotropic thin film anisotropic or oriented in the direction of bridging the electrodes. To obtain the anisotropic flux sensitive element, vapor-deposition of the ferromagnetic material such as a permalloy is carried out in a magnetic field set up in the direction of bridging the electrodes.

Figure 2:
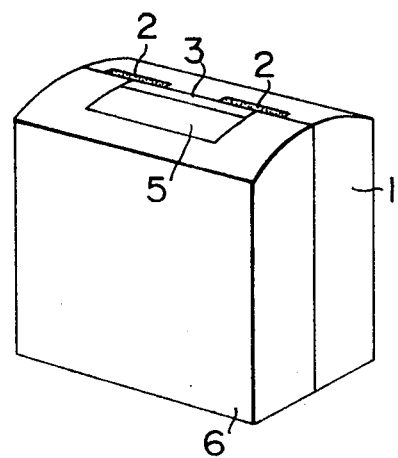
FIG. 2 is a perspective view of an embodiment of the magnetic head according to the invention.

FIG. 2 shows a completed flux sensitive unit magnetic head. It comprises electrodes 2 formed in a silicon substrate 1, a flux sensitive element 3 jointed bridging the electrodes 2, a ferromagnetic core 5 facing the effective area of the flux sensitive element 3, and a frame 6 holding the flux sensitive element and ferromagnetic core 5 in predetermined position with respect to the electrodes 2. The ferromagnetic core 5 serves the role of effectively leading signal residual flux from the recording medium to the flux sensitive element. If a ferromagnetic thin film is used as the flux sensitive element 3, the signal flux passes through the film. Usually, magnetization of a thin film in the direction of its thickness is very difficult due to a large demagnetization coefficient. With a ferromagnetic core provided in the direction of thickness of the ferromagnetic thin film, the demagnetization coefficient can be reduced to greatly facilitate the permeance of the signal flux. To this end, the ferromagnetic core 5 desirably has a high magnetic permeability. The electrical resistance of the element 3 is varied, due to the magneto-resistive effect, by the magnetic flux produced by the recording medium and passing through the element 3. The magnetic signal flux can be detected as a corresponding voltage signal by supplying, for example, a DC detection current to the element.

Now, examples of the multi-track head construction consisting of a number of unit magnetic heads arranged in the direction of the track width will be described in connection with FIGS. 3 and 4.

Figure 3:
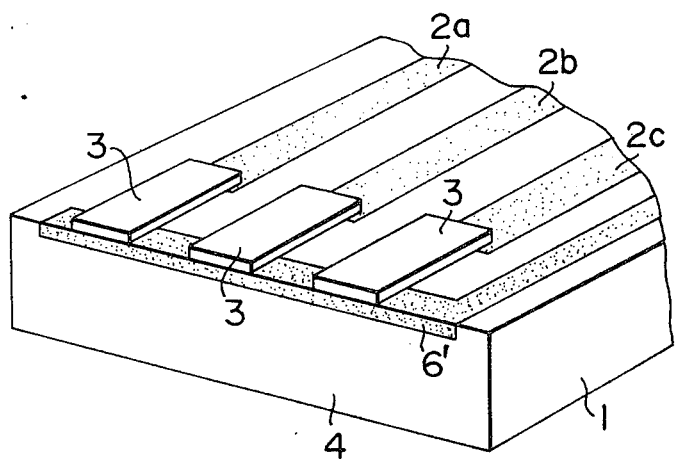
FIGS. 3 and 4 are fragmentary perspective views of other embodiments of the invention.

FIG. 3 shows the construction of a flux sensitive element type multi-track head, in which one electrode is common for all the unit heads. Electrodes 2a, 2b, 2c, . . . corresponding in number to the number of tracks are formed in a silicon substrate 1, each having one end slightly spaced from the front head face 4 adapted to face the recording medium. Designated at 6' is a common electrode having a portion extending along the front head face 4 in the direction of the track width. Flux sensitive elements 3 are provided for the respective electrodes 2a, 2b, 2c, . . . to connect them to the common electrode 6'. This construction may be formed in a manner similar to one for forming the unit magnetic head described above. With this construction of flux sensitive element type multi-track magnetic head, an output may be obtained from between each of the electrodes 2a, 2b, 2c, . . . common electrode 6'. Thus, the outputs of the individual unit heads can be obtained with a reduced total number of electrodes.

Figure 4:
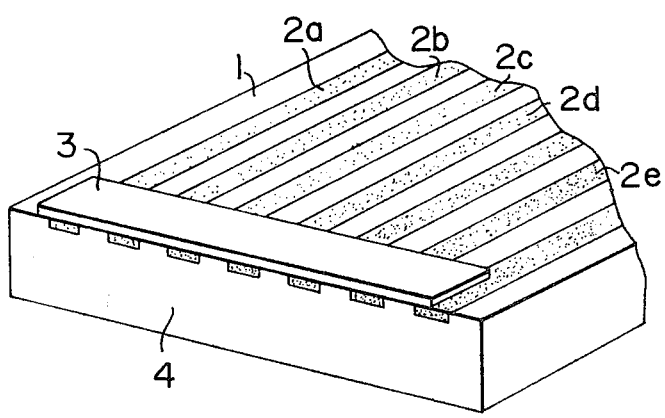

While the construction of FIG. 3 has used separate flux sensitive elements 3 corresponding in number to the number of tracks, FIG. 4 shows an example using a single or common flux sensitive element 3. More particularly, in this example electrodes 2a, 2b, 2c, . . . corresponding in number to the number of tracks plus one are formed in a silicon substrate 1, with their one end contiguous to the front face 4 of the head, and the common flux sensitive element 3 of a ferromagnetic film or presenting a magneto-resistive effect is formed atop the silicon substrate 1 and adjacent the front face of the head in the air gap thereof. With this construction for connecting the electrodes 2a, 2b, 2c, 2d, 2e extending inwardly from the front face 4 between the tracks, outputs are obtained from between electrodes 2a and 2b, between electrodes 2b and 2c, between electrodes 2c and 2d and so forth. In this multi-track head construction, the order of steps of forming electrodes 2 and flux sensitive element 3 may again be reversed as in the case of the unit head construction. Also, the electrodes may be deposited by vapor-deposition, or they may be formed in the substrate by means of diffusion and the flux sensitive element or elements may be formed thereon by vapor-deposition.

While the preceding embodiments have employed two-terminal flux sensitive elements, the concept of the invention can also be embodied by using four-terminal flux sensitive elements such as Hall elements.

Figure 5:
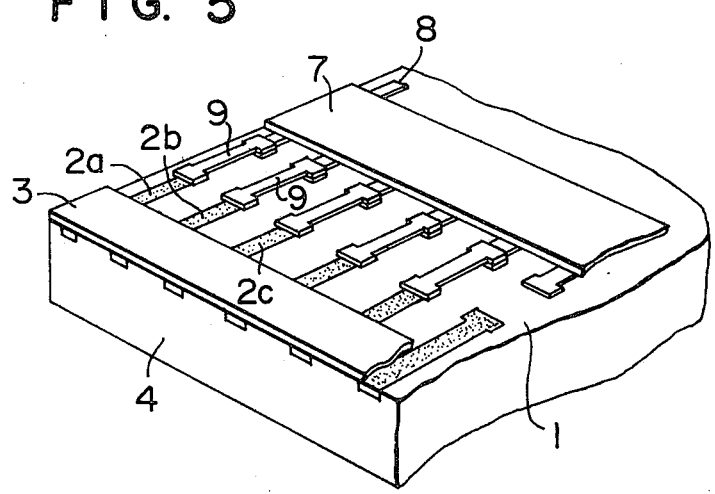
FIG. 5 is a fragmentary perspective view of a further embodiment of the invention.

FIG. 5 shows a further embodiment of the invention. In this embodiment, the associated electric circuitry 7 such as switching circuits is also formed by the semiconductor integrated circuit techniques on the semiconductor substrate 1 bearing a multi-track head of the construction of the preceding embodiment. Here, numeral 8 designates an input-output lead of the electric circuit 7, and numeral 9 designates leads connecting the electrodes of the unit heads and the electric circuit 7. These leads may be formed by means of vapor-deposition and photo-etching techniques. If it is found necessary, it is also possible to employ such connecting means as wire bonds.

As has been shown, according to the invention electrodes and flux sensitive elements are formed on or in a semiconductor substrate by means of the vapor-deposition or diffusion technique, so that it is possible to produce each unit head of small size with high precision.

Also, a plurality of unit magnetic heads can be formed simultaneously on the same substrate, which is very convenient for fabricating the multi-track head.

Further, since use is made of the semiconductor substrate, electric circuits such as amplifiers and switching circuits connected to the magnetic heads can also be formed on the same semiconductor substrate. Thus, it is possible to obtain even a very slight reproduced signal with a small flux sensitive element or elements.

Figure 6:
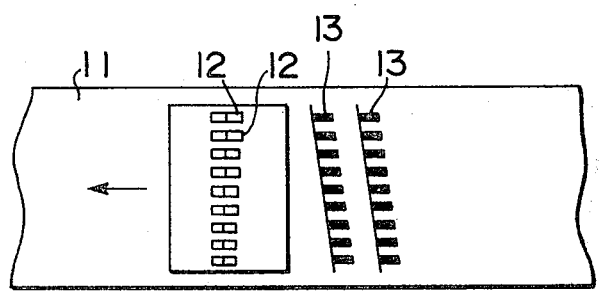
FIG. 6 is a schematic representation of a magnetic head system embodying the invention.

FIG. 6 shows a multi-track head embodying the invention in its use for recording. It has a number of unit heads 12 arranged in a row in the direction of the width of magnetic tape 11. These unit heads 12 are operated one after another to record signal as desired traces 13 on the magnetic tape 11 in a direction different from the direction of travel of the tape.

In this system, the unit heads have to be arranged close to one another. Also, problems are encountered in connection with how to dispose with leads to and from the unit heads.

Figure 7:
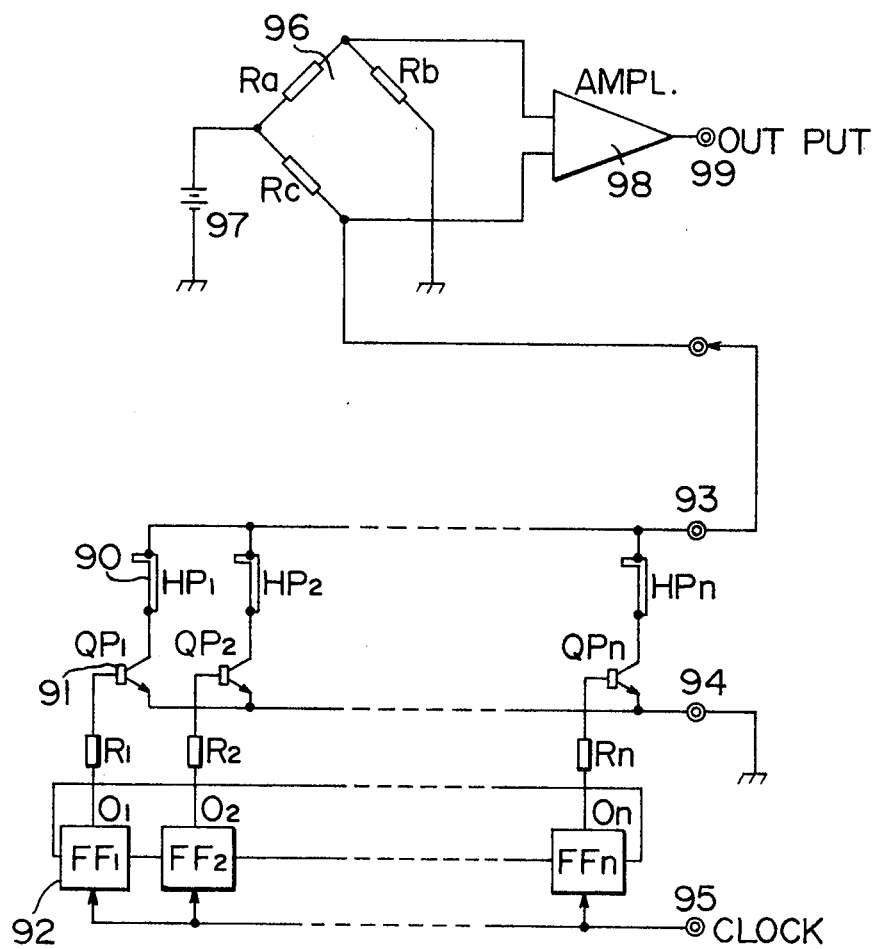
FIGS. 7 and 8 are electric connection diagrams showing the electric circuit connection of magnetic head systems according to the invention.

In FIG. 7, $HP_1$, $HP_2$, . . . , $HP_n$ designate unit magnetic heads of the construction described above. The magnetic material 90 of each of these unit magnetic heads are connected to a head selection switching transistor 91, and the other ends of the magnetic materials of the individual unit heads are connected to a common terminal 93. The individual switching transistors 91 are also connected at the other end to a common terminal 94. To the control input terminal of each switching transistor 91 is supplied the output of an associated ring counter or shift register 92, and clock pulses appearing at a clock signal terminal 95 are supplied to the individual ring counters or shift registers. With this arrangement, the cores of the individual unit heads can be successively driven. When the residual flux of a signal is present in the recording medium at a portion thereof corresponding to the gap of the selected unit head, signal flux permeates the core of the selected unit head. Where reproducing heads are constructed to utilize the magneto-resistive effect of a thin film of permalloy formed by vapor-deposition, the circuit between the common terminals 93 and 94 is connected as one side of a balancing bridge 96, a power supply 97 being connected across one diagonal of the bridge. Here, the other diagonal of the bridge is connected across a differential amplifier or ordinary pre-amplifier 98 to detect changes of resistance of the magneto-resistive element so as to obtain a reproduced output at an output terminal 99.

Figure 8:
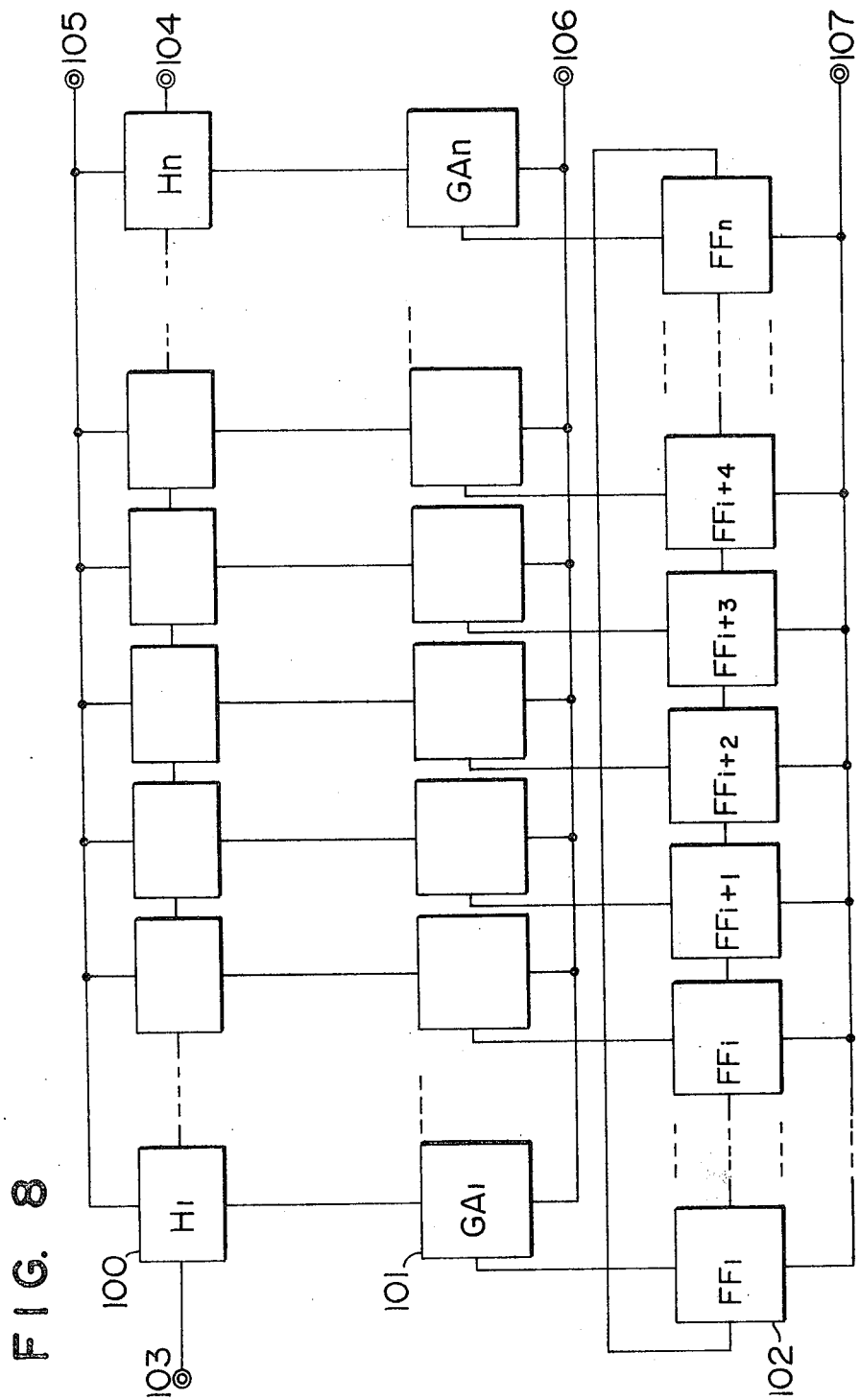

FIG. 8 shows a different embodiment of the multi-track head system according to the invention, where Hall elements are used for the unit heads of the flux sensitive type. N Hall elements $H_1$ to $H_n$ are arranged to receive signal residual flux from the recording medium. A bias current supply terminal 103 is connected through the successive Hall elements to another bias current supply terminal 104. One output detection terminal of each individual Hall element is connected to a common terminal 105, and the other output detection terminals of the Hall elements are connected to respective gate amplifiers $GA_1$ to $GA_n$. Ring counters or shift registers $FF_1$ to $FF_n$ are provided for the individual gate amplifiers, and clock pulses appearing at a clock terminal 107 are supplied to the ring counters or shift registers. With this construction, the Hall elements are successively driven under the control of the clock signal supplied to the clock terminal 107 at a speed corresponding to the clock frequency, and if residual flux is present at a portion of the recording medium corresponding to any of the Hall elements $H_1$ to $H_n$ a reproduced singal is obtained from between the terminals 105 and 106.

The flux sensitive element is thin so that its demagnetization coefficient is small and a relatively high density of detecting current will flow therethrough. The semiconductor substrate is provided to permit the conductive electrode layer to be formed in the substrate by diffusion or anodic oxidation processing to form a flat surface with the exposed surface of the conductive layer coplanar with the substrate surface. This permits the flux sensitive element to be very thin, highly reliable and minimizes breakage.

What we claim is:

1. Magnetic head apparatus comprising a semiconductor substrate having a principal surface and an end face; a plurality of spaced electrodes diffused into the principal surface of said substrate and extending substantially perpendicular to the end face of said substrate, each of said electrodes having a surface substantially coplanar with the principal surface of said substrate; and a ferromagnetic thin film presenting a magneto-resistive effect bridging said electrodes and contacting portions of the surfaces thereof, one edge of said thin film being contiguous with the end face of said substrate.

2. Magnetic head apparatus according to claim 1, wherein said ferromagnetic thin film is anisotropic in the direction bridging said electrodes parallel to said end face.

3. Magnetic head apparatus according to claim 1, wherein said electrodes are connected to a reproducing circuit formed as a semiconductor integrated circuit on said semiconductor substrate.

4. Magnetic head apparatus according to claim 1, wherein said thin film is formed atop said semiconductor substrate along one side thereof and contiguous to one end of each of said electrodes.

5. Magnetic head apparatus comprising a semiconductor substrate having a principal surface and an end face; a first electrode diffused into the surface of said semiconductor substrate and having a portion extending along said end face; a plurality of second spaced electrodes diffused into the principal surface of said substrate extending substantially perpendicular to the end face thereof, an end of each of said second electrodes being spaced a predetermined distance from the portion of said first electrode extending along said end face of said substrate, each of said electrodes having a surface substantially coplanar with the principal surface of said substrate; and a plurality of ferromagnetic thin film elements presenting a magneto-resistive effect, each of said thin films extending between a corresponding second electrode and said first electrode and contacting portions of the surfaces thereof.

6. Magnetic head apparatus as defined by claim 5 which further comprises a plurality of transistors each having first, second and third terminals, the first terminals of said transistors being connected to a common lead and the second terminal of each transistor being connected to a corresponding one of said plurality of second electrodes; and a shift register coupled to the third electrodes of said transistors for driving sequentially said flux sensitive elements.

7. Magnetic head apparatus for use with a recording medium comprising:
a semiconductor substrate having a principal surface and an end face;
a plurality of spaced electrodes diffused into the principal surface of said substrate and extending substantially perpendicular to the end face of said substrate, each of said electrodes having a surface substantially coplanar with the principal surface of said substrate;
a ferromagnetic thin film presenting a magneto-resistive effect bridging said electrodes and contacting portions of the surfaces thereof, one edge of said thin film being contiguous with the end face of said substrate; and
a magnetic core held in contact with said thin film, the signal flux from said recording medium passing through said thin film and extraneous magnetic flux passing through said magnetic core.

* * * * *